United States Patent [19]

Hockaday

[11] Patent Number: 5,080,458

[45] Date of Patent: Jan. 14, 1992

[54] METHOD AND APPARATUS FOR POSITIONING AN OPTICAL FIBER

[75] Inventor: Bruce D. Hockaday, Vernon, Conn.

[73] Assignee: United Technologies Corporation, Hartford, Conn.

[21] Appl. No.: 600,802

[22] Filed: Oct. 22, 1990

[51] Int. Cl.⁵ .............................................. G02B 6/30
[52] U.S. Cl. ....................................... 385/14; 385/49
[58] Field of Search ..................... 350/96.11–96.15, 350/96.17, 96.20, 96.21, 320; 357/17, 19, 30, 74, 80; 250/227, 552; 156/304.1, 304.2, 158

[56] References Cited

U.S. PATENT DOCUMENTS

| | | | |
|---|---|---|---|
| 4,445,751 | 5/1984 | Divens et al. | 350/96.14 |
| 4,750,800 | 6/1988 | Fournier et al. | 350/96.11 |
| 4,867,524 | 9/1989 | Courtney et al. | 350/96.20 |
| 4,871,226 | 10/1989 | Courtney et al. | 350/96.11 X |
| 4,946,553 | 8/1990 | Courtney et al. | 156/304.1 |
| 4,973,133 | 11/1990 | Matz et al. | 350/96.17 X |

Primary Examiner—Akm Ullah
Attorney, Agent, or Firm—William W. Habelt

[57] ABSTRACT

The alignment of an optical fiber (2) with a light port (18) of an I/O chip (10) is facilitated by a fiber carrier (20) having a surface (22) in which a plurality of closely spaced, axially extending fiber carrying grooves (30) are formed. The end (4) of an optical fiber (2) is supported in a first narrower and shallower V-shaped groove segment (32) with the tip (6) of the fiber (2) extending in a cantilevered fashion over a second wider and deeper V-shaped groove segment (34) with the tip end face (8) in facing relationship with the I/O chip (10). A ground electrode (40) is disposed on a wall of the first groove segment (32) in contact with the received end 4 of the fiber (2) for electrically grounding the fiber. A pair of independently energizible actuator electrodes (42, 44) are disposed on opposed side walls of the second groove segment (34). By selectively energizing the actuator electrodes 42,44, an electrostatic field is imposed about the tip (6) of the fiber (2) thereby selectively moving the tip (6) relative to the I/O chip (10) in a direction normal to the axis of the groove (30).

12 Claims, 4 Drawing Sheets

METHOD AND APPARATUS FOR POSITIONING AN OPTICAL FIBER

TECHNICAL FIELD

This invention relates to the mounting of optical fibers to an integrated optic device and, more particularly, to a method and apparatus for positioning an optical fiber relative to an integrated optic chip for coupling so as to optimize the coupling efficiency.

BACKGROUND ART

Integrated optic devices, often referred to as I/O chips, are used in optical systems such as optical interferometers and fiber optic gyroscopes, particularly for space vehicle guidance. A key to producing integrated optic devices on a commercial basis lies in the development of an inexpensive technique for aligning and attaching an optical fiber which will carry the light signal to a light port of the I/O chip. In the art of interfacing I/O chips with optical fibers, the act of coupling an optic fiber to the I/O chip is commonly referred to as "pigtailing".

One method for pigtailing an optical fiber to the light port of an I/O chip is disclosed and described in commonly assigned U.S Pat. No. 4,867,524. As disclosed therein, there is provided a fiber carrier having a V-shaped or semi-circular shaped axially elongated groove formed in its surface. The groove, which is uniform over its length, serves to support the end of the optical fiber to be coupled to the I/O chip. The fiber carrier is made of a material which has thermal expansion characteristics which are substantially the same as those of the I/O chip to which the optical fiber is to be coupled.

In coupling the optical fiber to the I/O chip, a metallic layer is deposited on both the fiber carrier and the I/O chip. The optical fiber is positioned in the axial groove in the fiber carrier with its tip disposed at the end plane of the fiber carrier and bonded thereto by any suitable metal joining technique such as laser welding, electrostatic welding, braising, soldering and diffusion welding. The fiber carrier is then disposed with the tip of the optical fiber it carries adjacent the light port of the I/O chip and the position of the fiber carrier adjusted until the light transfer and throughput between the I/O chip and the optical fiber is maximized by moving the fiber carrier in a plane normal to the axis of the groove in which the optical fiber is bonded, for example by rotating the fiber carrier with respect to the light port of the I/O chip until maximum light passes through the port. When the maximum transmittal of light is detected, the fiber carrier is welded to the I/O chip by any suitable metal joining technique such as those mentioned above with respect to the bonding of the optic fiber to the fiber carrier.

Although the method of pigtailing an optical fiber to an I/O chip disclosed in U.S. Pat. No. 4,867,524 is effective, it is labor and capital intensive. Additionally, the necessity of moving the fiber carrier in order to optimize alignment of the optic fiber to the light port of the I/O chip renders this method unsuitable for simultaneously positioning a multiplicity of closely spaced fibers at the light port of an I/O chip.

Accordingly, it is an object of the present invention to provide a method for positioning an optical fiber relative to an integrated optic device to which the tip at the end of the optical fiber is to be bonded wherein the necessity of moving the fiber carrier to align the optical fiber for maximum light transfer and throughput is eliminated.

It is a further object of the present invention to provide an inexpensive method for simultaneously positioning a multiplicity of optical fibers relative to an integrated optic device to which the tips at the end of the optical fibers are to be bonded.

Additionally, it is an object of the present invention to provide a fiber carrier for use in positioning one optical fiber or a multiplicity of optical fibers relative to an integrated optic device to which the tips at the end of the optical fibers are to be bonded without the necessity of moving the fiber carrier to align the optical fiber to maximize light transfer and throughput.

DISCLOSURE OF INVENTION

A method is provided for positioning an optical fiber relative to an integrated optic device to which a tip of an end of the optical fiber is to be bonded. In accordance therewith, the end of the optical fiber is positioned in an axially extending groove in a fiber carrier with the tip thereof juxtaposed in a cantilevered manner in facing relationship to a face of the integrated optic device disposed normal to the axis of said groove. To position the tip, the optical fiber received in the groove is electrically ground and an electrostatic field is selectively imposed about the cantilevered tip of the optical fiber thereby selectively moving the tip of the optical fiber relative to the optic device in a direction normal to the axis of said groove.

Further, there is provided a fiber carrier for supporting an optical fiber having a tip to be coupled to an integrated optic device in accordance with the method aspect of the present invention. The fiber carrier has a carrier body having a fiber carrying surface extending between a pair of opposed, spaced end faces. At least one, and preferably a plurality of closely spaced axially extending grooves are formed in the fiber carrying surface to extend between the one end faces across the fiber carrying surface. Each groove comprises a first narrower and shallower segment and a second wider and deeper segment which extends from one end face to the first groove segment. Preferably, both the first and second groove segments are V-shaped. The first groove segment adapted to receive and support the optical fiber with the end portion of the optical fiber juxtaposed in a cantilevered manner over the second groove segment with the tip of the optical fiber disposed at the end face of the carrier body in facing relationship to a face of the I/O device when disposed adjacent thereto.

Ground electrode means are disposed in the first groove segment so as to contact the received end of the optical fiber in the first groove segment for grounding when energized the received end of the optical fiber. Actuator electrode means are disposed in the second groove segment in spaced relationship from the end portion of the optical fiber juxtaposed in a cantilevered manner over the second groove segment, for selectively imposing when energized an electrostatic field about the cantilevered tip of the optical fiber thereby selectively moving the tip of the optical fiber relative to the optic device in a direction normal to the axis of said groove. Most advantageously, the actuator electrode means comprises a pair of independently energizible actuator electrodes disposed in a V-shaped second groove segment in opposed relationship with the first of the actuator electrodes disposed on one of the sloping walls and the second of the actuator electrodes disposed on the other sloping wall of the V-shaped groove, each of the actuator electrodes being disposed in spaced relationship from the end portion of the optical fiber juxtaposed in a cantilevered manner over the second groove segment.

A retainer electrode may also be disposed in the first groove segment on at least one side wall thereof, but being electrically insulated from the received end of said optical fiber so as to prevent electrical contact therebetween. When energized, the retainer electrode serves to establish an electrostatic force for clamping the received end of the optical fiber in position within said first groove segment.

Feedback electrode means may also be disposed in the second groove segment in opposed relationship closer to the end face than the actuator electrodes. Most advantageously, the feedback electrode means comprises a pair of feedback electrodes with the first of the feedback electrodes disposed on one of the sloping walls and the second of the feedback electrodes disposed on the other sloping wall of a V-shaped groove. Each of the feedback electrodes is disposed in spaced relationship from the end portion of the optical fiber juxtaposed in a cantilevered manner over the second groove segment for monitoring the movement of the cantilevered tip of the optical fiber under the influence of the electrostatic field imposed by the actuator electrode means.

BRIEF DESCRIPTION OF DRAWING

These and other objects, features and advantages of the present invention will become more apparent in light of the following detailed description of the invention and the embodiments thereof illustrated in the accompanying drawing, wherein.

BEST MODE FOR CARRYING OUT THE INVENTION

Figure 1:
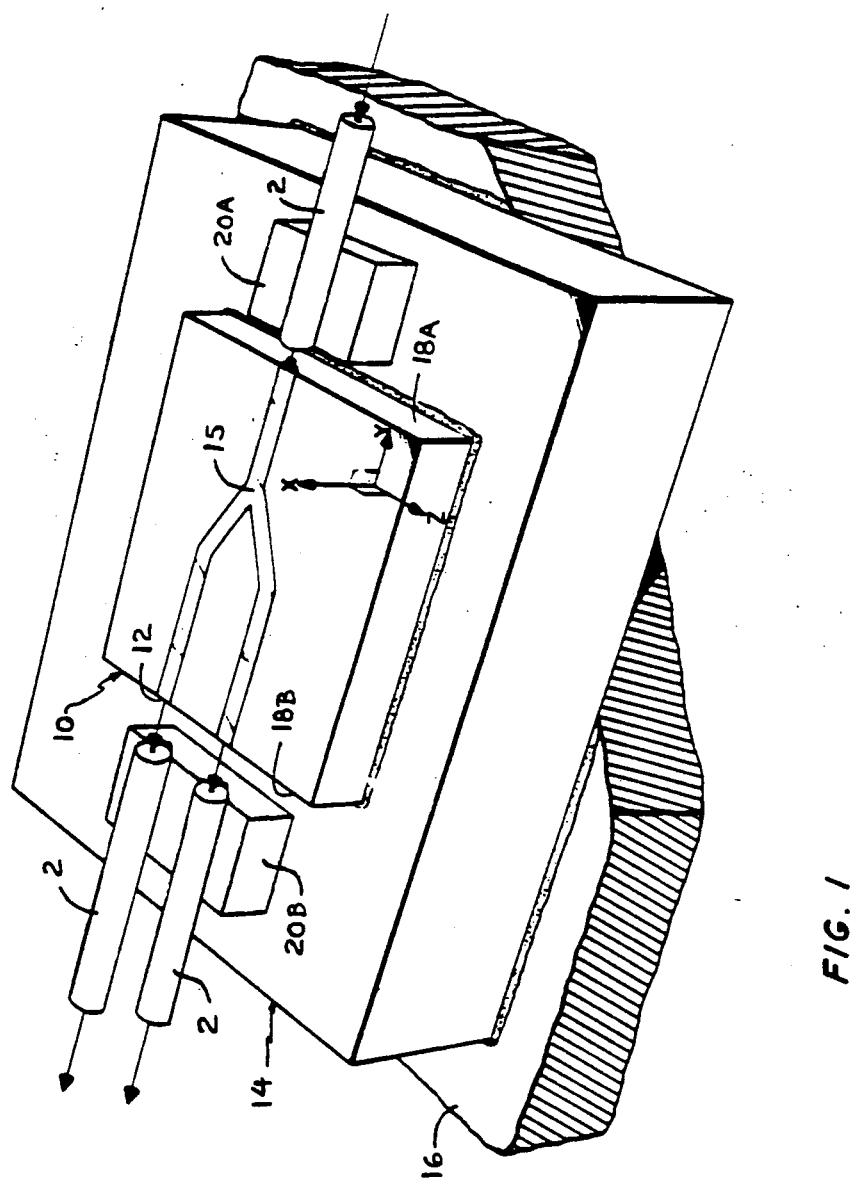
FIG. 1 is a perspective view illustrating the mounting of a plurality of optical fibers to an integrated optic chip through use of a fiber carrier in accordance with the present invention.

Referring now to FIG. 1 of the drawing, there is depicted therein the assembly of a plurality of optical fibers 2 to an integrated optic device 10, herein also referred to as an I/O chip. The term I/O chip herein refers in general to a class of devices for guiding or controlling light transmission in thin film layers or in narrow waveguide channels formed in suitable dielectric materials well known in the art, e.g. silicon, polymer, glass or crystal, such as lithium niobate or lithium tantalate. For purposes of illustration, the I/O chip 10 is shown as consisting of a simple "Y" shaped optical waveguide 15 formed in the crystal structure of the chip 10 by means known in the art, e.g. ion exchange or titanium diffusion. The particular characteristics, nature and function of the I/O chip, its waveguide layout and the material from which it is made are not germane to the present invention.

To facilitate coupling of the optical fibers 2 to the light ports 12 of the I/O chip 10, the chip is mounted in a desired position on the surface of a support substrate 14 by conventional means, for example by ultravioletly cured adhesive. In conventional practice, the support substrate 14 is itself mounted to a suitable support structure 16 with a compliant adhesive, such as silicon rubber, so as to limit stress transmission from the support structure 16 to the substrate 14.

With the I/O chip 10 positioned and mounted to the surface of the support substrate 14, the fiber carriers 20A and 20B, which respectively support the input and output optic fibers 2, are positioned on the surface of the support substrate 14 adjacent the input and output faces 18A and 18B, respectively, of the I/O chip 10. The end 4 of each optical fiber 2 is positioned in an axial groove 30 in its respective fiber carrier 20A or 20B with its end 8 of its tip disposed at the end plane of the fiber carrier adjacent the I/O chip and in close proximity to the light ports 12 o which the optical fibers are to be coupled.

In the prior art, it has been conventional practice to align the optical fiber with the light input port of the I/O chip by moving the fiber carrier associated therewith in the plane of the adjacent face of the I/O chip, i.e. the XZ plane designated in FIG. 1, until the amount of light transmitted through the light port is maximized. The fiber carrier was then bonded in this position to the substrate adjacent to the I/O chip by epoxy or welding as desired. With the fiber carrier secured in the optimal position for light transfer, the optical fiber carried thereon was then bonded to the I/O chip to complete the pigtailing process.

In accordance with the present invention, the necessity of adjusting the position of the fiber carrier 20 in the plane of the adjacent input/output face 18 of the I/O chip 10 is eliminated by providing a method of and means for moving only the tip of the optical fiber 2 carried on the fiber carrier 20 after the fiber carrier itself has been either bonded directly to the I/O chip 10 or mounted on the substrate adjacent to the I/O chip 10. To facilitate alignment of the tip of the optical fiber 2 with its associated light port 12 so as to maximize light transmission therebetween, the end 4 the optical fiber 2 is clamped in an axially extending groove 30 in the fiber carrier 20 with the tip 6 of the optical fiber 2 juxtaposed in a cantilevered manner in facing relationship to the input/output face 18 of the I/O chip 18. To adjust the position of the tip 6 of the optical fiber 2 relative to the light port 12 of the I/O chip 10, the metal coated end 4 of the optical fiber 2 is electrically grounded and an electrostatic field is generated about the cantilevered tip 6 of the optical fiber 2 thereby selectively moving the tip 6 of the optical fiber relative to the light port 18 of the I/O chip in a direction normal to the axis of the groove 30 in which the end 4 of the optical fiber 2 is clamped.

Figure 2:
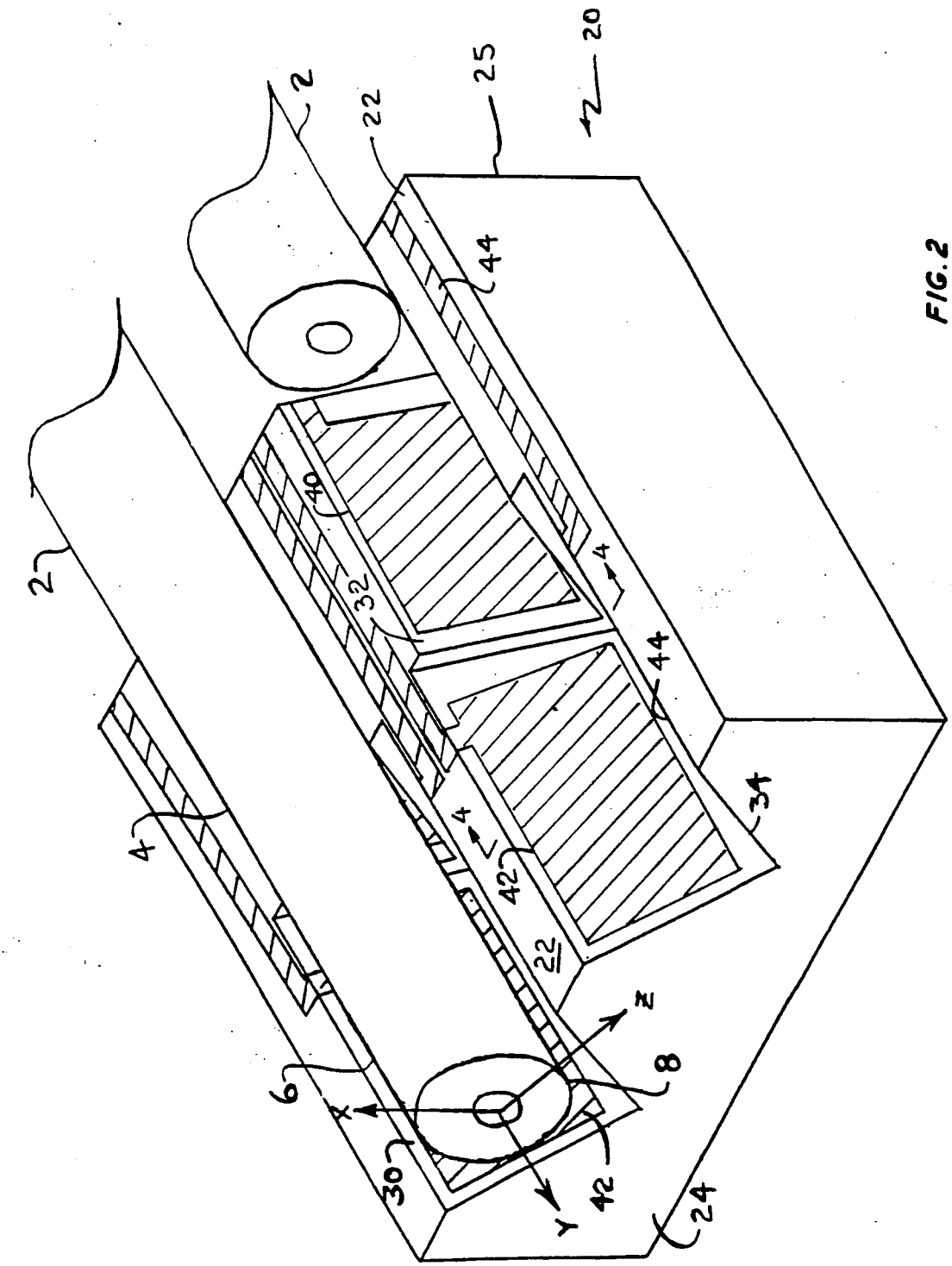
FIG. 2 is a perspective view of a preferred embodiment of the fiber carrier of the present invention.
Figure 3:
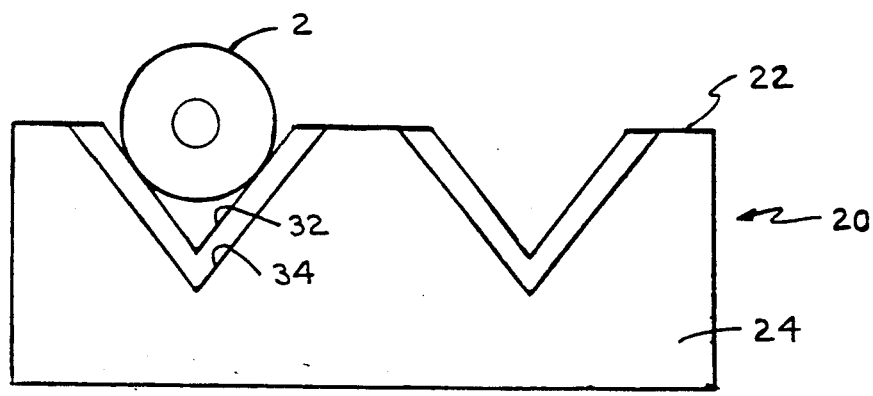
FIG. 3 is a side elevational view of the end face of the fiber carrier of FIG. 2.
Figure 4:
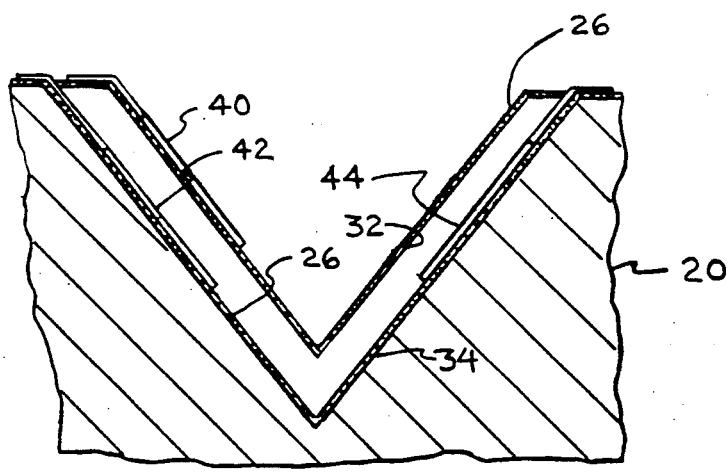
FIG. 4 is an enlarged cross-sectional elevation view taken along line 4—4 of FIG. 2.

Referring now to FIGS. 2, 3 and 4, there is depicted therein one embodiment of the fiber carrier 20 of the present invention which is particularly adapted to facilitate alignment of the optical fibers carried thereon with their respective light ports in accordance with the method aspect of the present invention. The fiber carrier 20 illustrated in FIGS. 2, 3 and 4 is adapted to carry two optical fibers, one of which has been cut away for purposes of better illustrating the elements of the fiber carrier 20. It is to be understood that the fiber carrier 20 of the present invention may be designed to carry only one optical fiber or any desired number of closely spaced optical fibers.

As illustrated, the fiber carrier 20 comprises a substantially rectangular parallelepiped body having a surface 22 in which are formed, typically by etching, one or more axially extending grooves 30 having opposed (i.e. facing) sidewalls. Most advantageously, each of the grooves 30 is a V-shaped groove having sloping opposed sidewalls. However, it is to be understood that the grooves 30 may be of other cross-sectional configuration so long as opposed sidewalls are provided for mounting various electrodes as herein described. For example, the grooves 30 may be substantially rectangular U-shaped grooves having generally upright sidewalls. The fiber carrier 20 may advantageously be made of a material which has a coefficient of thermal expansion in the plane of the carrier mounting surface, i.e. end face 24, which is substantially equal to the coefficient of thermal expansion of the mounting surface of the I/O chip 10, i.e. the input/output face 18, and most advantageously, of the same material as the I/O chip as disclosed in commonly assigned U.S. Pat. No. 4,750,800. For example, the fiber carrier 20 may be made of silicon, polymers, glass or crystal, e.g. lithium niobate or lithium tantalate.

Each groove 30 is etched or otherwise formed in the surface 22 of the fiber carrier 20 so as to extend perpendicularly rearwardly across the fiber carrier 20 between the first and second end faces 24 and 25 disposed at opposite ends of the carrier surface 22 and is comprised of first and second coaxially aligned V- shaped segments 32 and 34. The first segment 32 is narrower and shallower than the second segment 34 and is positioned aft thereof so as to extend from the second segment 34 to the second end face 25 of the fiber carrier 20. The second segment 34 is deeper and wider than the first segment 32 and extends rearwardly from the first end face 24 of the fiber carrier to the forward end of the first segment 32. After the grooves 30 are etched or otherwise formed in the surface 22, a thin layer 26 of insulating material, such as silicon dioxide, is deposited on the surface 22 and the surface of the grooves 30 to prevent electrical conduction through the substrate of the fiber carrier 20.

In the embodiment of the fiber carrier 20 shown in FIGS. 2, 3 and 4, three separate electrodes are deposited in the grooves 30 on the surface of the insulation layer 26 covering the opposed facing walls of the groove 30. A first thin wafer-like electrode 40 is deposited on one wall of the first segment 32 of the V-shaped groove 30 and a pair of second thin wafer-like electrodes 42 and 44 are deposited in the second segment 34 of the V-shaped groove 30 on the opposite sloping sidewalls thereof, that is with one electrode on one wall of the of the V-shaped segment and the other electrode on the other wall thereof. The second electrodes 42 and 44 are independently energizible such that either one may be energized while the other is not or such that they may both be energized but at different power levels.

In operation, a metal coated end 4 of the optical fiber 2 is clamped in a groove 30 in the surface 22 of the fiber carrier 20 with the end face 8 of the tip 6 of the optical fiber 2 positioned in the plane of the end face 24 of the fiber carrier 20. With the end 4 of the optical fiber 2 so positioned in the groove 30, the optical fiber is supported in the narrower and shallower segment 32 of the groove 30 remotely from the end face 24 of the fiber carrier 20, while tip portion 6 of the end 4 of the optical fiber 2 extends out of the first segment 32 of the groove 30 in a cantilevered fashion through the second wider and deeper segment 34 of the groove 30 so as to be disposed in spaced relationship away from the sidewalls of the second segment 34 of the groove 30.

With the optical fiber 2 so positioned in the groove 30, the first electrode 40 deposited on one wall of the first narrower and shallower groove segment 32 is energized to ground the metal coated end 4 of the optical fiber 2 disposed therein in contact with the grounding electrode 40 which is deposited on top of the insulation layer 26. Once the end 4 of the optical fiber 2 is electrically grounded, the second electrodes 42 and 44 deposited on the sidewalls of the second deeper and wider segment 34 of the groove 30 are selectively energized to generate an electrostatic field about the tip 6 of the optical fiber 2. The imposition of this electrostatic field on the tip 6 causes the cantilevered tip 6 to move in a direction normal to its axis (which is at least parallel to and typically coaxial with the axis of the groove in which the optical fiber is supported) thereby resulting in a movement of the end face 8 of the tip 6 relative to its associated light port.

To align the end face 8 of the tip 6 with its associated light port in accordance with the present invention, light is passed through the optical fiber 2 and the transmission therefrom through the light port is monitored. The power to the independent actuator electrodes 42 and 44 is then selectively varied so as to alter the position of the end face 8 of the cantilevered tip 6 relative to the light port until the monitored transmission of light therethrough hits a maximum. Once this maximum point is found, the associated power levels to the respective independent actuator electrodes 42 and 44 are maintained until the tip 6 of the optical fiber 2 so positioned is bonded to the I/O chip 10. Thereafter, the power is cut to the actuator electrodes 42 and 44 and to the grounding electrode 40.

Figure 6:
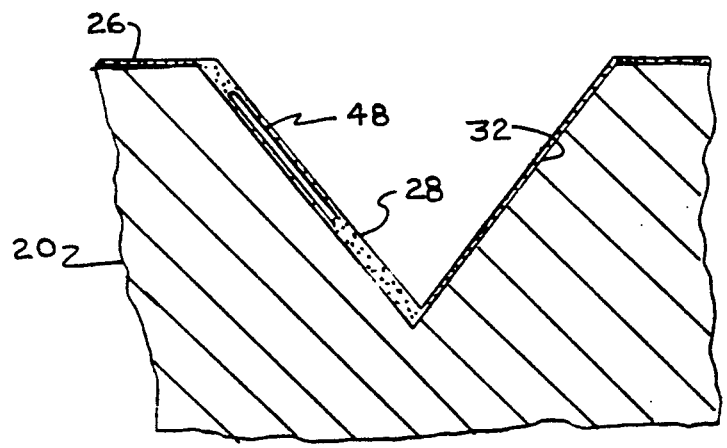
FIG. 6 is an enlarged cross-sectional elevation view taken along line 6—6 of FIG. 5.
Figure 5:
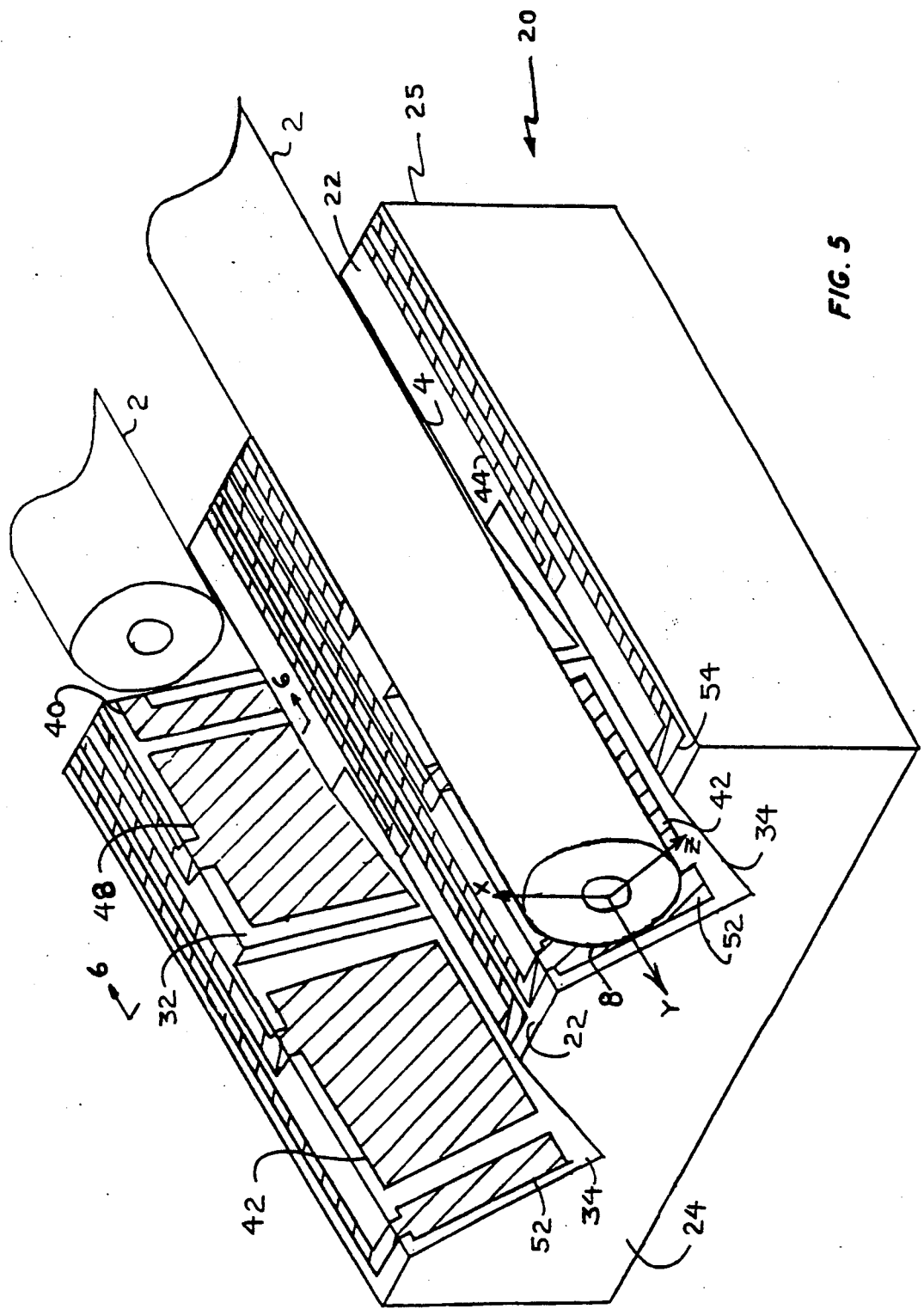
FIG. 5 is a perspective view of an alternate preferred embodiment of the fiber carrier of the present invention.

In the embodiment of the fiber carrier 20 shown in FIGS. 5 and 6, three additional thin wafer-like electrodes are deposited on the grooves 30. A pair of feedback electrodes 52 and 54 are deposited in the second segment 34 of the V-shaped groove 30 near the end thereof adjacent the end face 24 of the fiber carrier 20. These feedback electrodes 52 and 54 are deposited on the opposite sloping walls of the second groove segment 34, that is with one electrode on one wall of the of the V-shaped segment and the other electrode on the other wall thereof, forward of the actuator electrodes 42 and 44, respectively. The feedback electrodes 52 and 54 are electrically independent of each other and serve as capacitive micrometers to monitor the movement of the end face 8 of the tip 6 under the influence of the electrostatic field generated by the actuator electrodes 42 and 44. The feedback electrodes 52 and 54 will each form a variable capacitance with the presence of the grounded metal coating on the optical fiber, which capacitance may be monitored and utilized for closed loop control purposes.

Additionally, a retainer electrode 48 is deposited in the first narrower and shallower groove segment 32 on one or both sidewalls thereof. However, unlike the grounding electrode 40 which is deposited on the surface of the insulating layer in the first groove segment 32 so as to contact the metal coated end 4 of the optical fiber, the retainer electrode 48 is not permitted to contact the metal coated end 4 of the optical fiber 2, but rather is electrically insulated therefrom by a layer 28 of insulating material, such as silicon dioxide. The retainer electrode 48 is energized to produce an electrostatic force whereby the metal coated end 4 of the optical fiber 2 is clamped in position in the first groove segment 32. Once the cantilevered tip 6 of the optical fiber 2 has been properly aligned as hereinbefore described and the the tip 6 has been bonded to the I/O chip, the power to the retainer electrode 48 is cut thereby releasing the electrostatic clamp.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention. For example, as noted hereinbefore, the grooves 30 of the fiber carrier 20 of the present invention are advantageously of a V-shaped cross-section, but are not limited thereto. The grooves 30 may be formed of other cross-sectional configurations, such as rectangular or U-shaped, so long as there are provided spaced, opposed side walls in a first narrower and shallower groove segment and a second wider and deeper groove segment to accommodate the various electrodes required in carrying out the method of the present invention.

We claim:

1. An apparatus for supporting an optical fiber having a tip to be coupled to an integrated optic device, said apparatus comprising:
   a. a carrier body having a fiber carrying surface and first and second spaced end faces disposed at opposite ends of said fiber carrying surface;
   b. at least one axially extending groove formed in said fiber carrying surface and extending between said first and second end faces across said fiber carrying surface, said groove having a first narrower and shallower segment and a second wider and deeper segment, said second groove segment extending from said first end face to said first groove segment, said first groove segment extending from said second end face to said second groove segment and adapted to receive and support the optical fiber with the end portion of the optical fiber juxtaposed in a cantilevered manner over said second groove segment with the tip of the optical fiber in facing relationship to a face of the integrated optic device disposed adjacent said first end face;
   c. ground electrode means disposed in said first groove segment so as to contact the received end of the optical fiber in said first groove segment for grounding when energized the received end of the optical fiber; and
   d. actuator electrode means disposed in said second groove segment in spaced relationship from the end portion of the optical fiber juxtaposed in a cantilevered manner over said second groove segment, for selectively imposing when energized an electrostatic field about the cantilevered tip of the optical fiber thereby selectively moving the tip of the optical fiber relative to the optic device in a direction normal to the axis of said groove.

2. An apparatus as recited in claim 1 wherein said second groove segment is a relatively wide and deep V-shaped groove having opposed sloping walls.

3. An apparatus as recited in claim 2 wherein said first groove segment is a V-shaped groove which is narrower and shallower than the V-shaped groove of said second groove segment.

4. An apparatus for supporting an optical fiber having a tip to be coupled to an integrated optic device, said apparatus comprising:
   a. a carrier body having a fiber carrying surface and first and second spaced end faces disposed at opposite ends of said fiber carrying surface;
   b. at least one axially extending groove formed in said fiber carrying surface and extending between said first and second end faces across said fiber carrying surface, said groove having a first narrower and shallower segment and a second wider and deeper segment, said second groove segment extending from said first end face to said first groove segment and being a relatively wide and deep V-shaped groove having opposing sloped walls, said first groove segment extending from said second end face to said second groove segment and adapted to receive and support the optical fiber with the end portion of the optical fiber juxtaposed in a cantilevered manner over said second groove segment with the tip of the optical fiber in facing relationship to a face of the integrated optic device disposed adjacent said first end face;
   c. ground electrode means disposed in said first groove segment so as to contact the received end of the optical fiber in said first groove segment for grounding when energized the received end of the optical fiber; and
   d. a pair of independently energizible actuator electrodes disposed in said second groove segment in opposed relationship with the first of said actuator electrodes disposed on one of the sloping walls and the second of said actuator electrodes disposed on the other sloping wall of the V-shaped second groove segment, each of said actuator electrodes disposed in spaced relationship from the end portion of the optical fiber juxtaposed in a cantilevered manner over said second groove segment for selectively imposing when energized an electrostatic field about the cantilevered tip of the optical fiber thereby selectively moving the tip of the optical fiber relative to the optic device in a direction normal to the axis of said groove.

5. An apparatus as recited in claim 4 further comprising retainer electrode means disposed in said first groove segment for establishing when energized an electrostatic force for clamping the received end of the optical fiber in position within said first groove segment, said retainer electrode means being electrically insulated from the received end of said optical fiber so as to prevent electrical contact therebetween.

6. An apparatus as recited in claim 4 further comprising feedback electrode means disposed in said second groove segment for monitoring the movement of the cantilevered tip of the optical fiber under the influence of the electrostatic field imposed by said actuator electrode means, said feedback electrode means being disposed closer to said first end face of said carrier body than said actuator electrode means.

7. An apparatus for supporting an optical fiber having a tip to be coupled to an integrated optic device, said apparatus comprising:

a. a carrier body having a fiber carrying surface and first and second spaced end faces disposed at opposite ends of said fiber carrying surface;

b. at least one axially extending groove formed in said fiber carrying surface and extending between said first and second end faces across said fiber carrying surface, said groove having a first narrower and shallower segment having opposed facing sidewalls and a second wider and deeper segment having opposed facing sidewalls, said second groove segment extending from said first end face to said first groove segment, said first groove segment extending from said second end face to said second groove segment and adapted to receive and support the optical fiber with the end portion of the optical fiber juxtaposed in a cantilevered manner over the second groove segment with the tip of the optical fiber disposed at the first end face of said carrier body in facing relationship to a face of the integrated optic device;

c. a ground electrode disposed in said first groove segment on at least one sidewall thereof so as to contact the received end of the optical fiber in the first groove segment, said ground electrode being energizible for electrically grounding the received end of the optical fiber;

d. a pair of independently energizible actuator electrodes disposed in said second groove segment in opposed relationship with the first of said actuator electrodes disposed on one of the sidewalls and the second of said actuator electrodes disposed on the other sidewall of the second groove segment, each of said actuator electrodes disposed in spaced relationship from the end portion of the optical fiber juxtaposed in a cantilevered manner over said second groove segment, each of said electrodes being engerizible for selectively imposing an electrostatic field about the cantilevered tip of the optical fiber thereby selectively moving the tip of the optical fiber relative to the optic device in a direction normal to the axis of said groove;

e. a retainer electrode disposed in said first groove segment on at least one sidewall thereof and electrically insulated from the received end of said optical fiber so as to prevent electrical contact therebetween, said retainer electrode being energizible for establishing an electrostatic force for clamping the received end of the optical fiber in position within said first groove segment; and f. a pair of feedback electrodes disposed in said second groove segment in opposed relationship closer to said first end face than said actuator electrodes with the first of said feedback electrodes disposed on one of the sidewalls and the second of said feedback electrodes disposed on the other sidewall of the V-shaped groove, each of said feedback electrodes disposed in spaced relationship from the end portion of the optical fiber juxtaposed in a cantilevered manner over said second groove segment for monitoring the movement of the cantilevered tip of the optical fiber under the influence of the electrostatic field imposed by said actuator electrode means.

8. An apparatus as recited in claim 7 wherein said second groove segment is a relatively wide and deep V-shaped groove having opposed sloping walls.

9. An apparatus as recited in claim 8 wherein said first groove segment is a V-shaped groove which is narrower and shallower than the V-shaped groove of said second groove segment.

10. A method for positioning an optical fiber relative to an integrated optic device to which a tip of an end of the optical fiber is to be bonded, said method comprising:

a. positioning the end of the optical fiber in an axially extending groove in a fiber carrier with the tip thereof juxtaposed in a cantilevered manner in facing relationship to a face of the integrated optic device;

b. electrically grounding the end of the optical fiber; and c. selectively imposing an electrostatic field about the cantilevered tip of the optical fiber thereby selectively moving the tip of the optical fiber relative to the optic device in a direction normal to the axis of said groove.

11. A method as recited in claim 10 wherein positioning the end of the optical fiber in an axially extending groove in a fiber carrier with the tip thereof juxtaposed in a cantilevered manner in facing relationship to a face of the integrated optic device comprises electrostatically clamping a first portion of the end of the optical fiber in a first shallower portion of said groove with a second portion of the end of the optical fiber adjacent the tip of the optical fiber extending in a cantilevered manner from the first narrower and shallower portion of said groove over a second deeper portion of said groove.

12. A method for positioning an optical fiber relative to an integrated optic device to which a tip of an end of the optical fiber is to be bonded, said method comprising:

a. positioning the end of the optical fiber in an axially extending groove in a fiber carrier with the tip thereof juxtaposed in facing relationship to a face of the integrated optic device by electrostatically clamping a first portion of the end of the optical fiber in a first shallower portion of said groove with a second portion of the end of the optical fiber adjacent the tip of the optical fiber extending in a cantilevered manner from the first narrower and shallower portion of said groove over a second deeper portion of said groove;

b. electrically grounding the end of the optical fiber;

c. depositing at least one electrode in the second deeper portion said groove below the second portion of the end of the optical fiber extending in a cantilevered manner therethrough; and d. energizing said at least one electrode whereby an electrostatic field is generated about the cantilevered tip of the optical fiber thereby selectively imposing an electrostatic field about the cantilevered tip of the optical fiber thereby selectively moving the tip of the optical fiber relative to the optic device in a direction normal to the axis of said groove.

* * * * *